Figure 1:
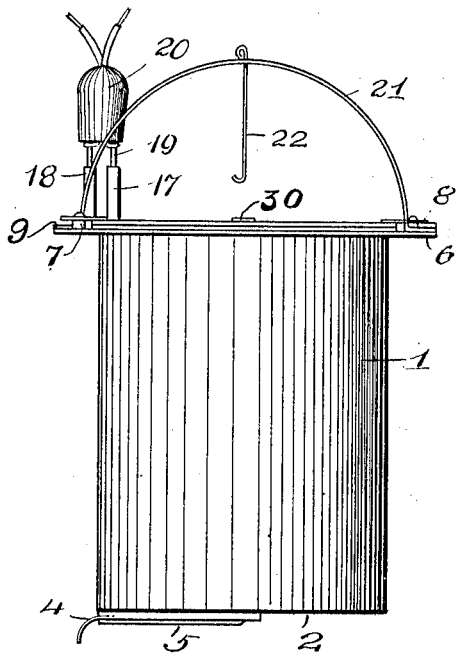

S. LOTZ.
RAT TRAP.
APPLICATION FILED MAY 5, 1911.

1,040,961.

Patented Oct. 8, 1912.

WITNESSES:
P. A. McCullough
K. H. Butler

INVENTOR.
S. Lotz,
BY
N. C. Evert & Co.
ATTORNEYS.

UNITED STATES PATENT OFFICE.

SAMUEL LOTZ, OF HARRISBURG, PENNSYLVANIA.

RAT-TRAP.

1,040,961.              Specification of Letters Patent.         Patented Oct. 8, 1912.

Application filed May 5, 1911.   Serial No. 625,154.

*To all whom it may concern:*

Be it known that I, SAMUEL LOTZ, a citizen of the United States of America, residing at Harrisburg, in the county of Dauphin and State of Pennsylvania, have invented certain new and useful Improvements in Rat-Traps, of which the following is a specification, reference being had therein to the accompanying drawing.

This invention relates to rat traps, and the primary object of my invention is to furnish a trap with electrical means for shocking and electrocuting a rat or rodent that enters the trap.

A further object of the invention is to provide a portable trap of the above type that is simple, safe to use and highly efficient for exterminating small animals.

The above objects are attained by a mechanical construction that will be hereinafter specifically described and then claimed, and reference will now be had to the drawing wherein like numerals of reference designate corresponding parts throughout the several views, in which:—

Figure 2:
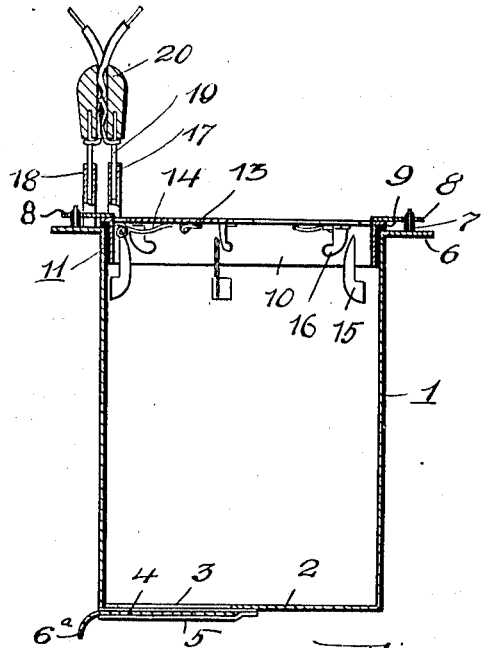
Figure 3:
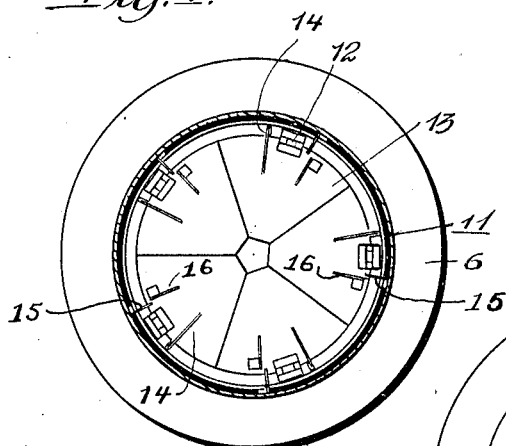
Figure 4:
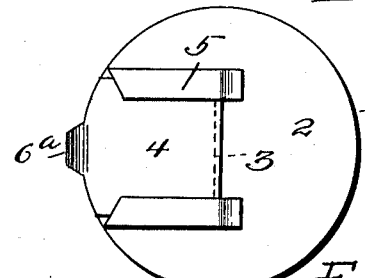
Figure 5:
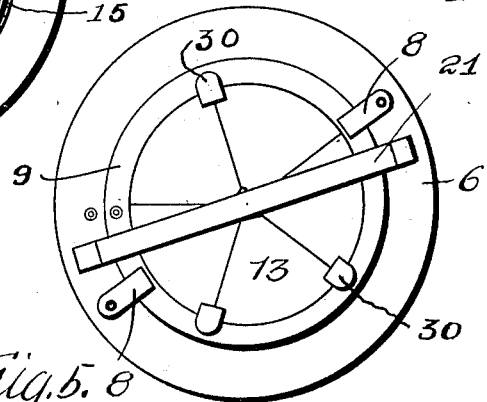

Figure 1 is a side elevation of the trap, Fig. 2 is a vertical sectional view of the trap, Fig. 3 is a horizontal sectional view of the same looking toward the cover of the trap, Fig. 4 is a bottom plan of the trap, and Fig. 5 is a top plan of the same.

A trap in accordance with this invention comprises a cylindrical metallic receptacle 1 having the bottom 2 thereof provided with an opening 3. The opening 3 is normally closed by a slide 4 detachably held in engagement with the bottom 2 of the receptacle 1 by guides 5 secured to the bottom 2. The slide 4 has the outer end thereof provided with a handle $6^a$, whereby it can be easily moved in the guides 5.

The upper edges of the receptacle 1 have a peripheral flange 6 provided with diametrically opposed insulated posts 7. The posts are preferably formed by vertical pins surrounded by insulation material, as rubber. Engaging the posts are outwardly extending apertured straps 8 carried by the annular flange 9 of a collar 10, said collar being surrounded by insulation material 11 and fitted in the upper end of the receptacle 1.

Hinged to the inner side of the collar 10, as at 12 are a plurality of sector-shaped trap doors 13 constituting a lid, and these trap doors are normally maintained in a horizontal or closed position by springs 14, carried by the collar 10 and engaging the under sides of said doors, suitable stops 30 being provided for limiting the upward movement of the doors.

The inner side of the receptacle 1 adjacent to the collar 10 has a plurality of inwardly and upwardly projecting arms 15, corresponding in number to the trap doors 13. The trap doors are provided with depending blades 16, said arms 15 and the blades 16 acting to limit the swinging movement of the doors downwardly.

The flange 9 of the collar 10 has a socket 17 and the flange 6 of the receptacle 1 has a socket 18. Adapted to engage in these sockets are the plugs 19 of a wire terminal 20, which is in circuit with a suitable source of electrical energy.

The flange 6 of the receptacle 1 supports a bail 21 and this bail is provided with a central depending bait holder 22, said bail and bait holder forming one of the terminals of the electrocuting circuit, the complemental terminal being provided by the doors.

In operation, the electrocuting circuit is completed by the rodent reaching the bait or bait holder while in contact with the doors, the yielding portions playing an important part in providing this result, by reason of the fact that if an initial yielding movement tends to cause the frightening of the rodent, it would attempt to reach the holder as a support; should it reach it by jumping, the return of the doors would bring them into contact with the body of the rodent and thus complete the circuit, the holder extending sufficiently close to the plane of the doors as to practically insure this action.

The trap is immediately placed in condition to shock and electrocute a rat upon the terminal 20 being placed in engagement with the sockets 17 and 18. As the trap is portable, the terminal can be detached and the trap carried to a convenient place where the contents thereof can be removed.

What I claim is:—

In an electric trap, a receptacle having an annular flange, a collar supported by and insulated from said flange and the receptacle, said collar having a plurality of yieldable trap doors, a bail carried by said flange and supporting a bait holder located above said doors, and means for connecting the opposite sides of an electric circuit to said flange and collar respectively, whereby said doors and the bait holder will form the complemental terminals of an electrocuting circuit.

In testimony whereof I affix my signature in the presence of two witnesses.

SAMUEL LOTZ.

Witnesses:
M. R. ALLEMAN,
HENRY WIGUNA.

Copies of this patent may be obtained for five cents each, by addressing the "Commissioner of Patents, Washington, D. C."